E. PFARRE.
INDIA-RUBBER SURGICAL-TUBE.
No. 191,879. Patented June 12, 1877.
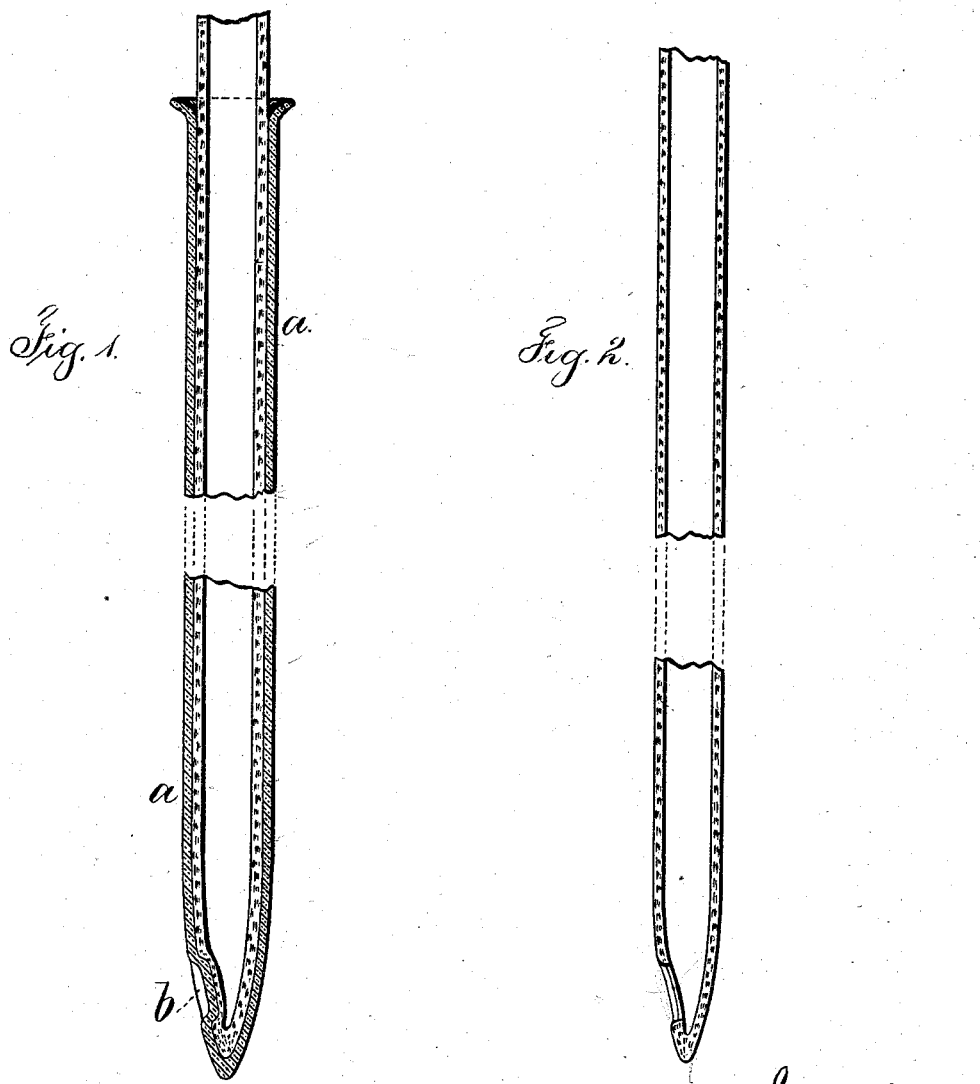

UNITED STATES PATENT OFFICE.

EDWARD PFARRE, OF BROOKLYN, NEW YORK.

IMPROVEMENT IN INDIA-RUBBER SURGICAL TUBES.

Specification forming part of Letters Patent No. 191,879, dated June 12, 1877; application filed April 7, 1877.

*To all whom it may concern:*

Be it known that I, EDWARD PFARRE, of Brooklyn, in the county of Kings and State of New York, have invented an Improvement in the Manufacture of India-Rubber Surgical Tubes, of which the following is a specification:

It is of great importance that catheters, stomach-tubes, enema, rectum, or other surgical tubes have an absolutely smooth surface and well-rounded point and eye; but the efforts heretofore have not been successful in producing any article of this kind in india-rubber, and especially has that been the case with the eye or opening of the tube, because the hole has been cut after the tube has been cured or vulcanized. Hence the edges of the opening have been angular and rough.

I employ a tubular glass mold, with an indentation at the place required for the eye or opening, and I cure the india-rubber tube by heat while under pressure within the tubular glass mold, so that the surface of the rubber is kept in close contact with the glass, and becomes as smooth as the texture of the rubber will allow, and the edges of the eye are rounded and perfectly smooth.

After the india-rubber tube has been cured or vulcanized it is removed by pulling it out of the glass tube, and then the eye is finished by passing a soft-metal rod into the tube, and cutting against the same in removing the film of india-rubber remaining at the inner surface of the eye.

In the drawing, Figure 1 represents the glass mold and the rubber tube within it, and Fig. 2 is a section of the finished india-rubber tube.

The tube *a*, of glass, is of the proper size, length, and shape for producing the outside of the india-rubber surgical tube. There is a depression at *b*, and this forms the eye-depression in the india-rubber. The uncured tube is placed within the glass mold, and pressed properly to place, so as to fit against the inside of the glass. A liquid, such as water, is now introduced into the india-rubber tube, under sufficient pressure to distend the tube, and bring all parts of its surface into contact with the interior of the glass mold. It is generally preferable to allow the end of the india-rubber tube to project beyond the mold sufficiently to allow for expansion when the end is closed and the tube heated in the curing operation.

The end of the tube may be enlarged to form a bulb of greater or less size, and the hole may be at the end or at a greater or less distance from the end.

The heat is usually obtained by steam or hot water in a closed vessel.

The result of this mode of manufacture is that the surface of the india-rubber that is in contact with the glass receives a polish and smoothness almost equal to that of the glass mold itself, and hence it is adapted to being introduced, with little or no friction, into the designated part of the body, and the eye is rounded at the edges and smooth, so as not to offer any obstruction to the movement of the instrument.

By the use of a complete tubular glass mold there are no fins or ribs upon the india-rubber, and the surface is made perfectly smooth in the act of vulcanizing.

I claim as my invention—

The india-rubber surgical tube having a rounded point, and an opening or eye having rounded polished edges, as a new article of manufacture.

Signed by me this 4th day of April, A. D. 1877.

EDWARD PFARRE.

Witnesses:
GEO. T. PINCKNEY,
CHAS. H. SMITH.